(12) United States Patent
Sali et al.

(10) Patent No.: US 7,210,631 B2
(45) Date of Patent: *May 1, 2007

(54) COLOR BAR CODE SYSTEM

(75) Inventors: Erez Sali, Savion (IL); Doniel M. Lax, Modiin (IL)

(73) Assignee: Imageid Ltd., Rosh Ha'ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/363,255

(22) Filed: Feb. 28, 2006

(65) Prior Publication Data

US 2006/0144947 A1    Jul. 6, 2006

Related U.S. Application Data

(62) Division of application No. 10/627,980, filed on Jul. 28, 2003, now Pat. No. 7,051,935.

(51) Int. Cl.
*G06K 7/00* (2006.01)
*G06K 19/08* (2006.01)

(52) U.S. Cl. .............................. 235/462.04; 235/462.06

(58) Field of Classification Search ........... 235/462.04, 235/462.06
See application file for complete search history.

(56) References Cited

U.S. PATENT DOCUMENTS 5,426,289 A * 6/1995 Kinoshita et al. ............ 235/469
6,902,113 B2 * 6/2005 Sali et al. .............. 235/462.04
2003/0118216 A1 6/2003 Goldberg

* cited by examiner

*Primary Examiner*—Lisa M. Caputo
(74) *Attorney, Agent, or Firm*—AlphaPatent Associates Ltd.; Daniel J. Swirsky (57) ABSTRACT

A color bar code system includes a camera reader to read at least one color bar code having a subset of N bar code colors, a color association unit and an identifier. The color association unit associates each point in a color space with one of the bar code colors. The color association unit is calibratable to the range of colors that the camera reader is expected to produce given at least one environmental condition in which it operates. The identifier uses the color association unit to identify an item associated with the bar code from the output of the camera reader.

6 Claims, 9 Drawing Sheets

COLOR BAR CODE SYSTEM

CROSS-REFERENCE TO RELATED APPLICATIONS

This application is a divisional application claiming benefit from U.S. patent application Ser. No. 10/627,980, filed Jul. 28, 2003 now U.S. Pat. No. 7,051,935, which is hereby incorporated by reference.

FIELD OF THE INVENTION

The present invention relates to color calibration and classification generally and to such for color bar codes in particular.

BACKGROUND OF THE INVENTION

Color bar codes are known in the art, though they are not prevalent. U.S. Pat. No. 5,426,289 to Kinoshita et al., U.S. Pat. No. 5,992,748 to Takahashi et al., and U.S. Pat. No. 5,869,828 to Braginsky teach different kinds of color bar codes.

Typically, a color bar code system creates color bar codes using a set of set of N of bar code colors. For example, N might be 5. To make the code, each bar code color is associated with a numerical value and a color value, where the color value is in any multi-dimensional color space, such as the red, green and blue (RGB) space or the cyan, magenta, yellow and black (CMYK) space. If there are N bar code colors, the bar code that uses that color scheme represents numbers in base N. One exemplary code (in the RGB color space) might be the following:

| Color  | R   | G   | B   | Numerical Value |
|--------|-----|-----|-----|-----------------|
| Black  | 0   | 0   | 0   | 0               |
| Blue   | 0   | 200 | 255 | 1               |
| Green  | 0   | 255 | 0   | 2               |
| Red    | 255 | 0   | 0   | 3               |
| Yellow | 255 | 255 | 0   | 4               |

In this example, there are five bar code colors and thus, the code is in base 5. Thus, a color bar code of the sequence [black, blue, green, yellow] represent the number 0124 in base 5 which translates to the base 10 number 0*125+1*25+2*5+4=39.

When printing a particular bar code, the color values of the various regions in the bar code are sent to the printer which, in turn, prints the color bar code. After printing, the color bar code is placed onto an item to be labeled. A color bar code reader is typically a color camera that includes an image sensor, such as a CCD (charge coupled device) or a CMOS (complementary metal oxide semiconductor) camera, and a relevant optical system. The reader reads the bar code and the bar code system identifies the item from the bar code. One exemplary color bar code system is discussed in PCT Publication WO 00/04711 to Shniberg et al., assigned to the common assignee of the present invention, which disclosure is incorporated herein by reference.

Unfortunately for color bar codes, a given color is not sufficiently distinct for classification from the image acquired by the reader, especially since the color perceived by the camera is affected by several parameters, such as the illumination and the spectral sensitivity of the sensor. This is discussed in the book by Wyszecki G. and Stiles W. S., *Color Science: Concepts and Methods, Quantitative Data and Formulae*, John Wiley & Sons, 2000, pp 117–127. Instead, colors are dependent on a multitude of effects. For example, lighting conditions affect colors significantly; as is well known, a white stripe will look purplish in ultraviolet (UV) light, slightly yellow in yellow light and slightly blue in blue light.

Thus, although bar code printer may have received the following bar code sequence for item 39 in the RGB color space: [(0,0,0), (0,200,255), (0,255,0), (255, 255,0)], the reader might produce RGB values [(10,15,15), (10,220, 235), (5,200,5), (245, 245,10)] in the locations of the image associated with the color bar code. None of the image colors are the RGB colors which were printed and thus, determining which code value was read is difficult.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
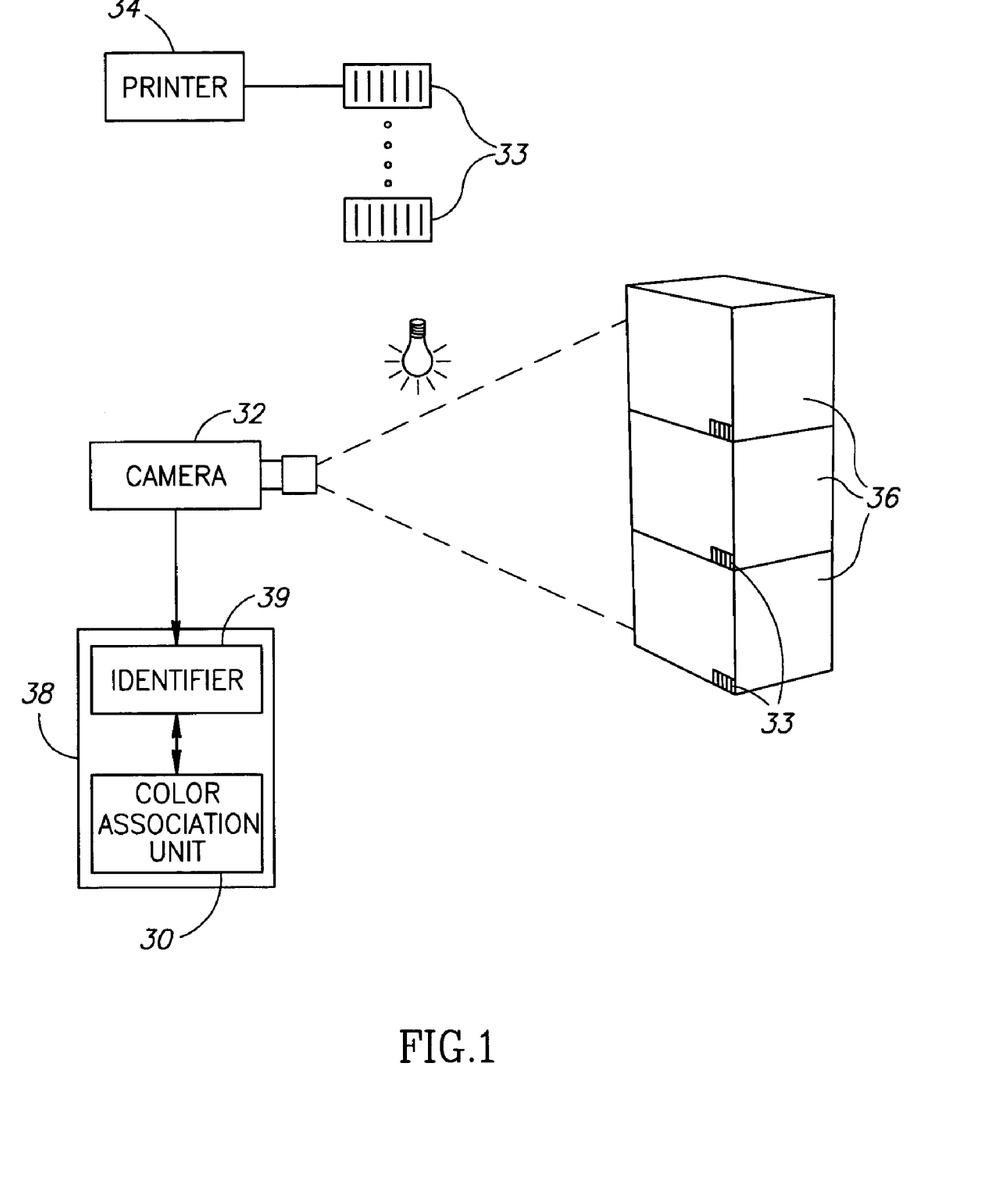
FIG. 1 is a schematic illustration of a color bar code system, constructed and operative in accordance with the present invention.

Reference is now made to FIG. 1, which illustrates a color bar code system using a color association unit 30. A camera reader 32 may read one or more color bar code labels 33, externally produced by a color production device 34 and pasted onto boxes 36 at some appropriate time. One exemplary color production device, used in the following description, might be a color inkjet or laser printer 34. Other color production devices might be a color copying machine. All are incorporated into the present invention.

Camera 32 may provide its output to a system controller 38, having an identifier 39 and color association unit 30. Identifier 39 may utilize color association unit 30, such as a lookup table (LUT), to determine which colors were imaged by camera 32. In accordance with a preferred embodiment of the present invention, color association unit 30 may calibrate a color space to the range of colors that camera 32 may be expected to produce given at least one environmental condition in which it operates. In accordance with a preferred embodiment of the present invention, color association unit may associate each point in the color space with one of the N bar code colors of the current bar code scheme based on the range of colors that camera 32 may be expected to produce.

The environmental conditions may be lighting conditions, camera conditions or printed color conditions. For example, camera 32 may have a wide angle lens and may operate only in artificial light and printer 34 may be an old, heavy duty printer which cannot produce bright colors.

The remaining operations to decode bar code labels 33 may be as described in PCT Publication WO 00/04711 to Shniberg et al., mentioned hereinabove.

Figure 2:
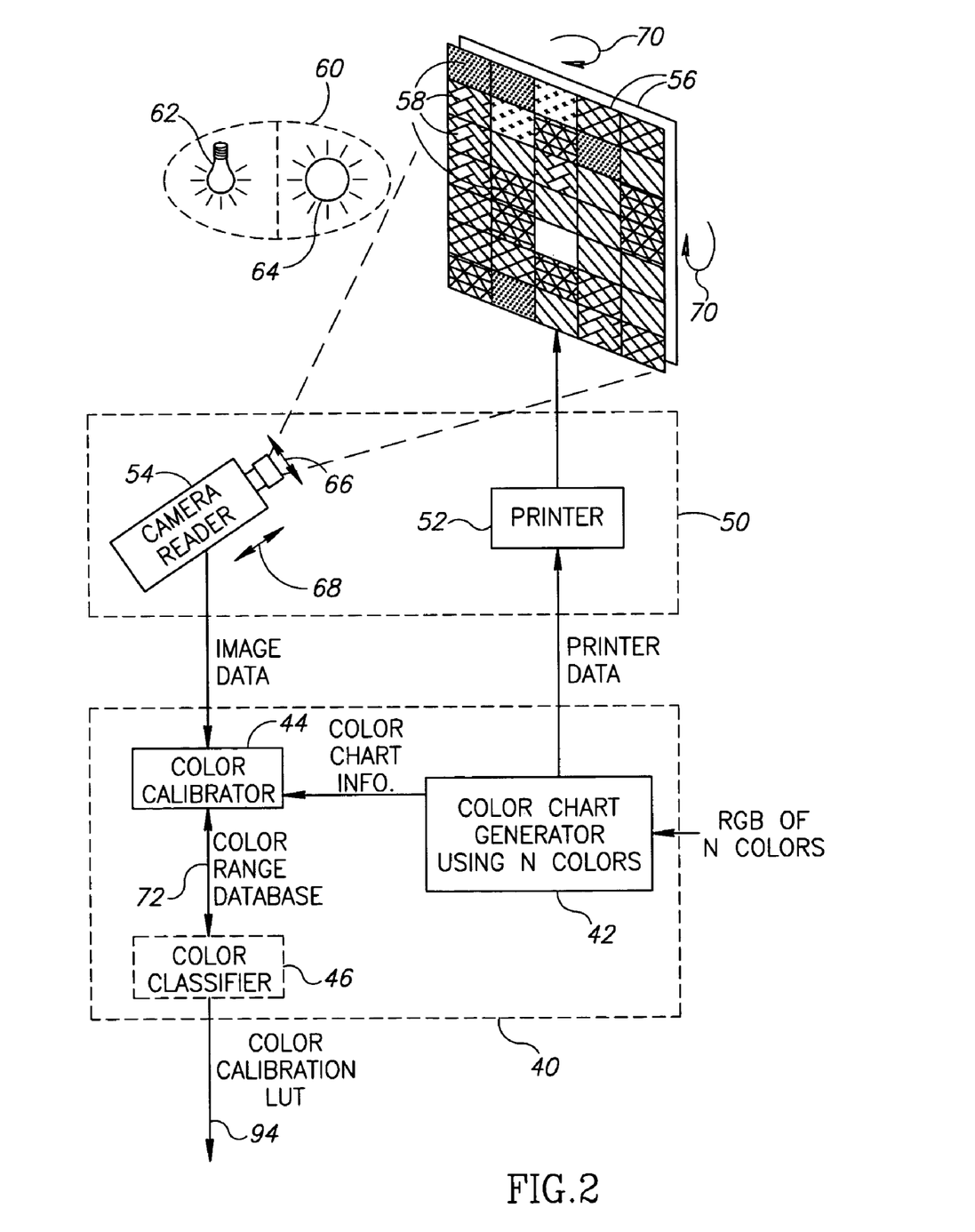
FIG. 2 is a schematic illustration of a color calibration system, useful in the system of FIG. 1.

Reference is now made to FIG. 2, which illustrates an exemplary calibration system 40 for color bar code systems, such as that of FIG. 1, and its operation with a printer 52 and a camera reader 54. In this embodiment, calibration system 40 may generate a color calibration LUT 94 to act as color association unit 30. Calibration system 40 may comprise a color chart generator 42, a color calibrator 44 and an optional color classifier 46 and may operate to calibrate a color space to the range of colors that camera 54 may be expected to produce given at least one environmental condition in which it operates.

Color chart generator 42 typically may generate a listing of color values for a plurality of color patches to be printed by printer 52 onto a substrate, such as paper. As shown in detail in FIG. 3, to which reference is now briefly made, the color chart, labeled 56, may have patches 58 of color, where each patch 58 may have one of the N bar code colors. Patches 58 may be placed next to each other, in one embodiment, with no delineating lines. Generator 42 may receive from a user the number N of bar code colors and the RGB of each of those colors. Generator 42 may have a predefined patch arrangement for every color scheme size N (i.e. one arrangement for 6 bar code colors, another for 7 bar code colors, etc). Such a placement may be random with the condition that each bar code color neighbors the N−1 other bar code colors at least once. The latter condition may enable calibration system 40 to capture any changes of viewed color due to the nearness of other colors.

Figure 3:
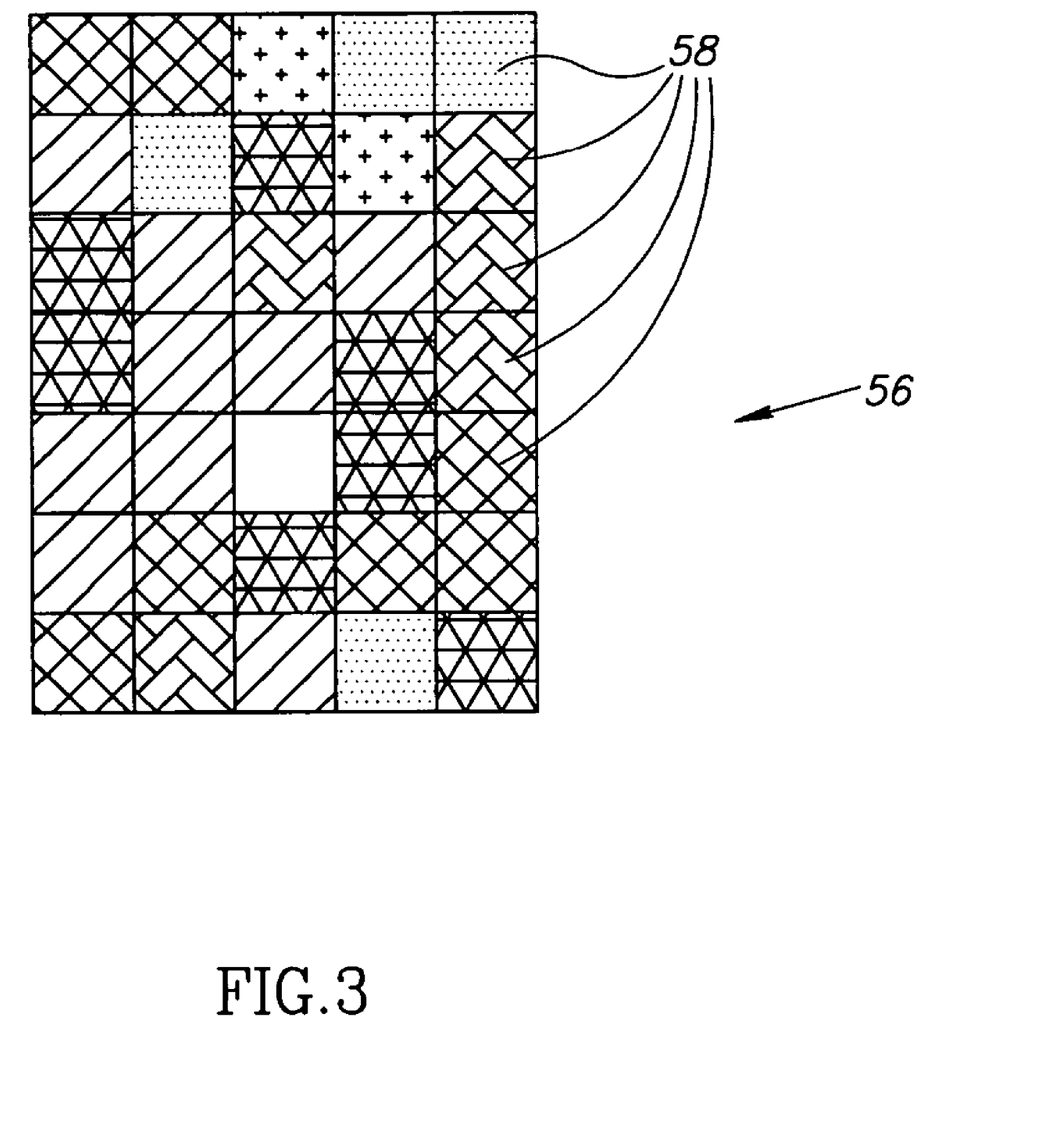
FIG. 3 is a schematic illustration of a color chart, useful in the system of FIG. 2.

Color chart 56 may be of any appropriate size for camera 32. In one embodiment, color chart 56 is on A4 paper and has 25 rows of 20 patches each. Patch generator 42 may provide the color chart information to color calibrator 44 and may provide printer data to printer 52 to produce color chart 56.

Camera 54 may then view color chart 56 and may generate an image of color chart 56. Since colors appear different under different conditions, in accordance with a preferred embodiment of the present invention, camera 54 may view color chart 56 repeatedly, each time providing its image output to color calibrator 44.

The different conditions may be any condition that may occur during the expected operation of color bar code system 50 (formed of camera 54 and printer 52). Thus, the lighting conditions 60 may be varied. For example, camera 54 may read color chart 56 in natural light 62 or under incandescent light 64. Other lighting conditions may include neon light, fluorescent light, cloudy light, direct sunlight, incandescent light, gas discharge lamps, such as Xenon or Mercury lamps, etc.

The camera conditions may be varied. Thus, camera 54 may view color chart 56 in focus or out of focus (as indicated by arrow 66) and at various distances from color chart 56 (as indicated by arrow 68).

The color chart conditions may be varied. This may include rotating color chart 56 in any direction, as indicated by arrows 70. Furthermore, the inks used by printer 52 may change over time. As this is not easily reproduced, patch generator 42 may produce multiple color charts 56, each with a different amount of noise in the color values.

Typically, the conditions chosen for the calibration procedure are those most likely to occur during the regular operation of color bar code system 50. Thus, if system 50 will always be operated under incandescent light, there is no need to run a test under florescent light. Moreover, if the system suddenly finds itself operating under fluorescent light, a new calibration procedure may be performed.

Once the data from the multiplicity of calibration runs have been collected, color calibrator 44 may attempt to associate the patch data for each color chart 56 with the viewed data. Once this is done, color calibrator 44 may attempt to associate the viewed data with the appropriate one of the N bar code colors. Thus, color calibrator 44 may produce a color range database 72 which lists each bar code color and the values produced by camera 54 upon viewing various patches of that color under the various conditions.

Figure 4A:
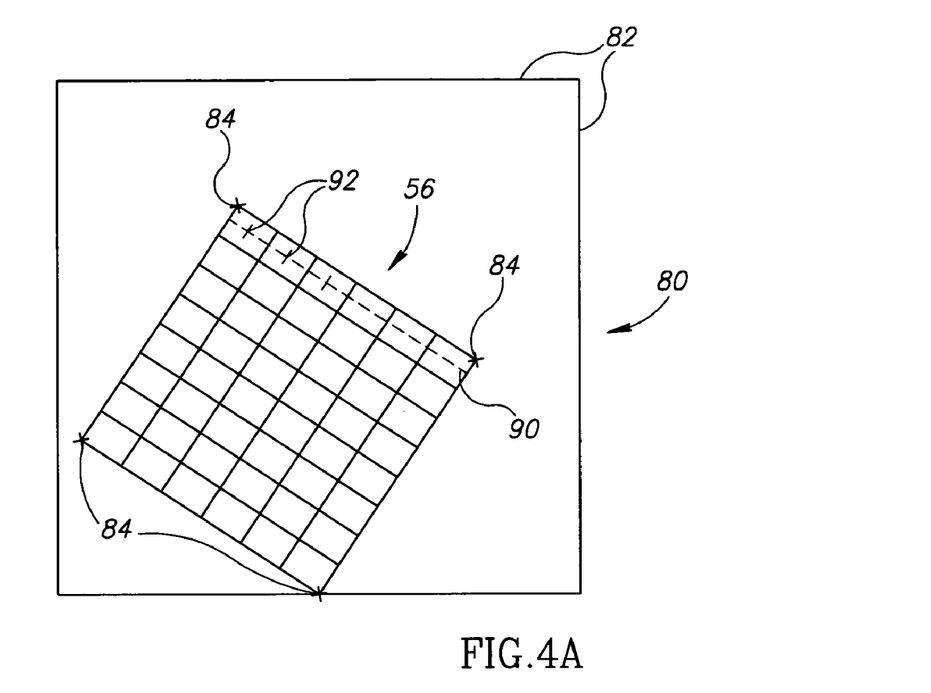
FIG. 4A is a schematic illustration of an exemplary output of a camera reader of FIG. 2.
Figure 4B:
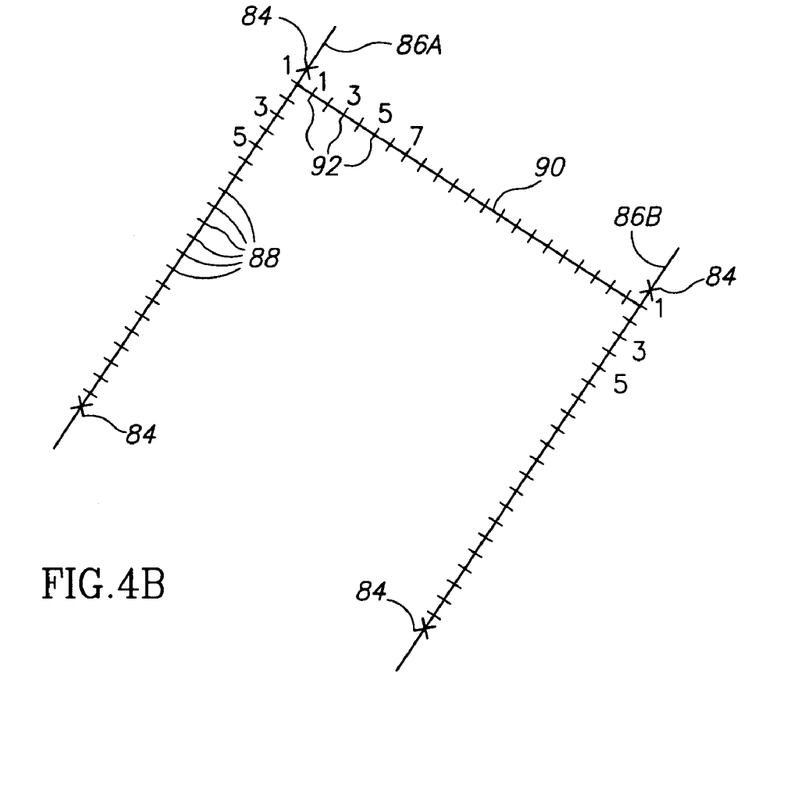
FIG. 4B is a schematic illustration of calculations performed on the output shown in FIG. 4A.

FIGS. 4A and 4B, to which reference is now made, are schematic illustrations useful in understanding how color calibrator 44 may determine the viewed color for each patch 58 (i.e. the patch data) from the image data received from camera 54.

FIG. 4A shows an exemplary image 80 received from camera 54. As can be seen, camera 54 viewed color chart 56 over only a portion of its field of view; moreover, color chart 56 is not aligned with axes 82 of camera 54. In accordance with a preferred embodiment of the present invention, color calibrator 44 may generate patch data by first having a user indicate corners 84 of color chart 56. Color calibrator 44 may determine the equation of two parallel lines 86A and 86B (FIG. 4B) running through two parallel neighboring pairs of corners 84. Color calibrator 44 may then divide the portion of lines 86A and 86B between corners 84 into twice the number of patches expected to be along the line. For example, if color chart 56 is a 10×10 square of patches 58, then color calibrator 44 may divide the portion of the line into 20 sections, marking each section with a division mark 88.

For each odd number division mark 88, color calibrator 44 may then drop a line 90 connecting the corresponding odd numbered division marks 88 and may divide line 90 into twice the number of patches as expected to be in that direction. For the example above, color calibrator 44 may divide line 90 into 20 sections and may select the odd numbered ones, here labeled 92. As can be seen in FIG. 4A, marks 92 fall out generally in the middle of patches 58.

Color calibrator 44 may then select the RGB values present at the location of marks 92 and may associate these values with the bar code color that was supposed to be printed for that patch. In other words, if color chart generator 42 (FIG. 2) listed that the $5^{th}$ color was printed for the $7^{th}$ patch in the $2^{nd}$ row, then color calibrator 44 may associate the RGB value at the $15^{th}$ division mark 92 of the $3^{rd}$ line 90 with the $5^{th}$ color and may store this association in color range database 72.

Figure 5:
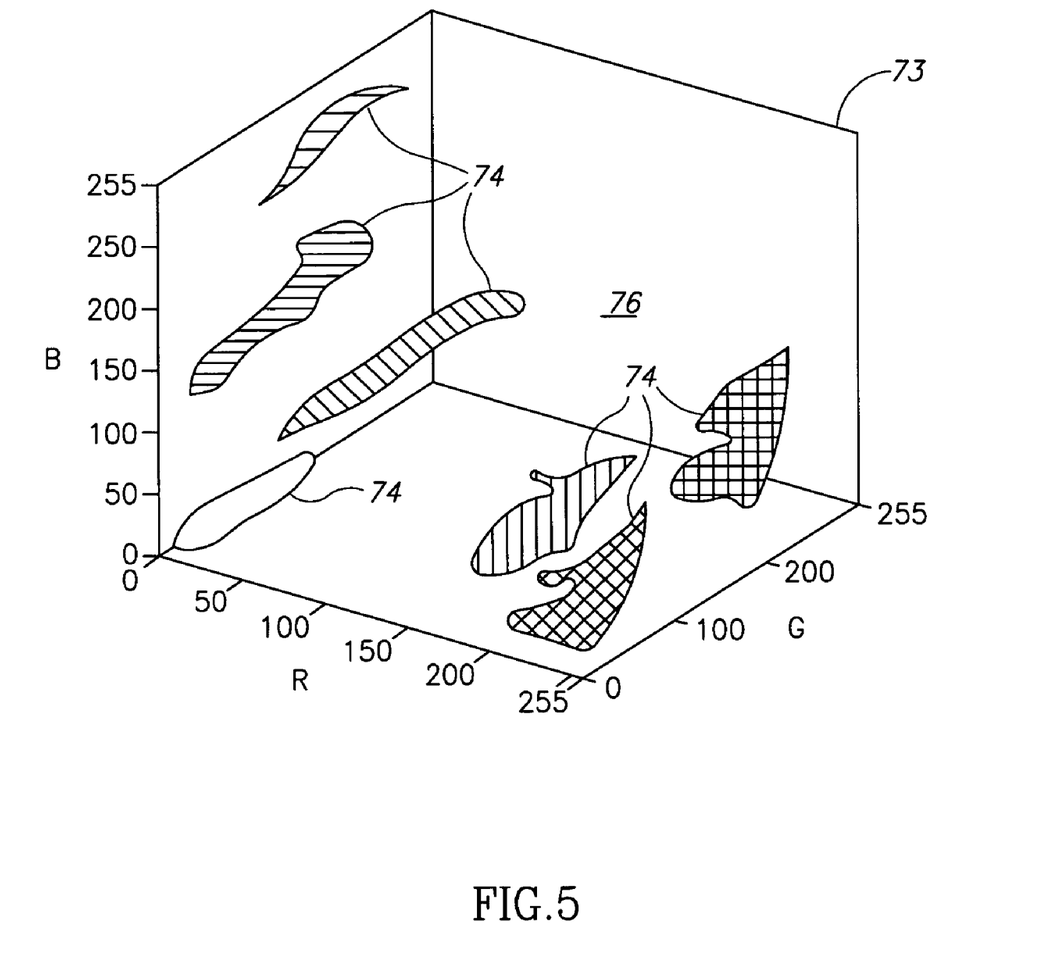
FIG. 5 is a schematic illustration of a three-dimensional plot of exemplary data received from the camera reader of FIG. 2.
Figure 6A:
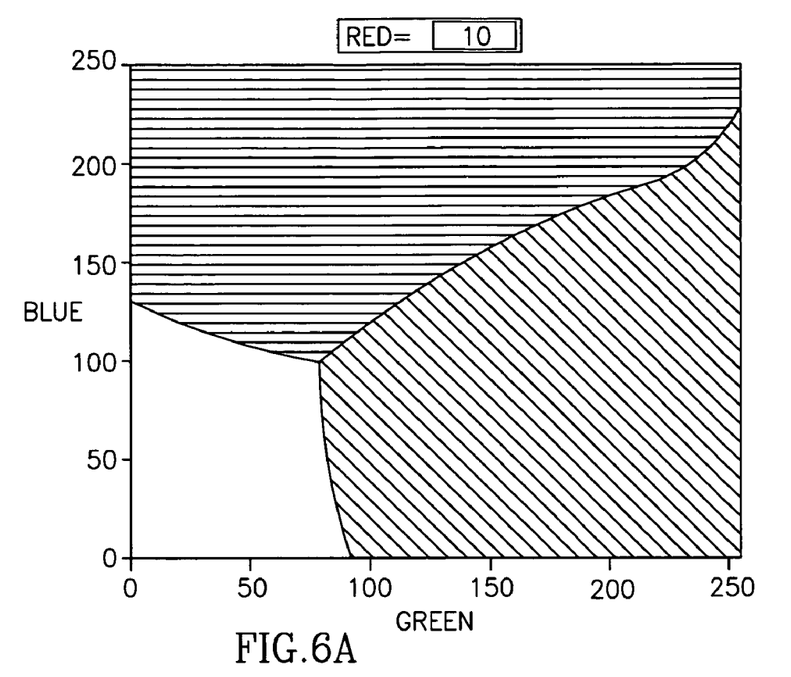
FIGS. 6A, 6B, 6C and 6D are graphical illustrations of slices of a three-dimensional color calibration LUT which is an output from the system of FIG. 2.
Figure 6B:
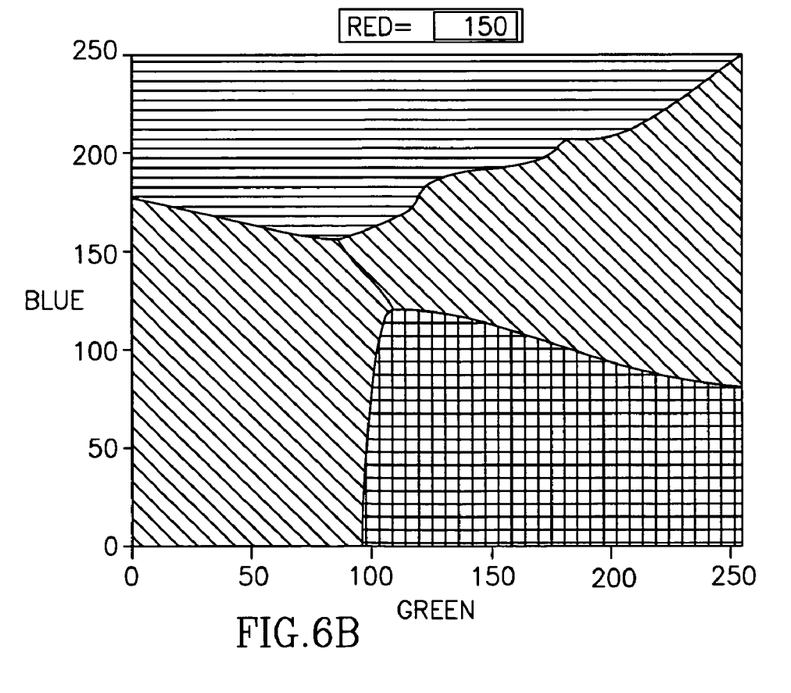
Figure 6C:
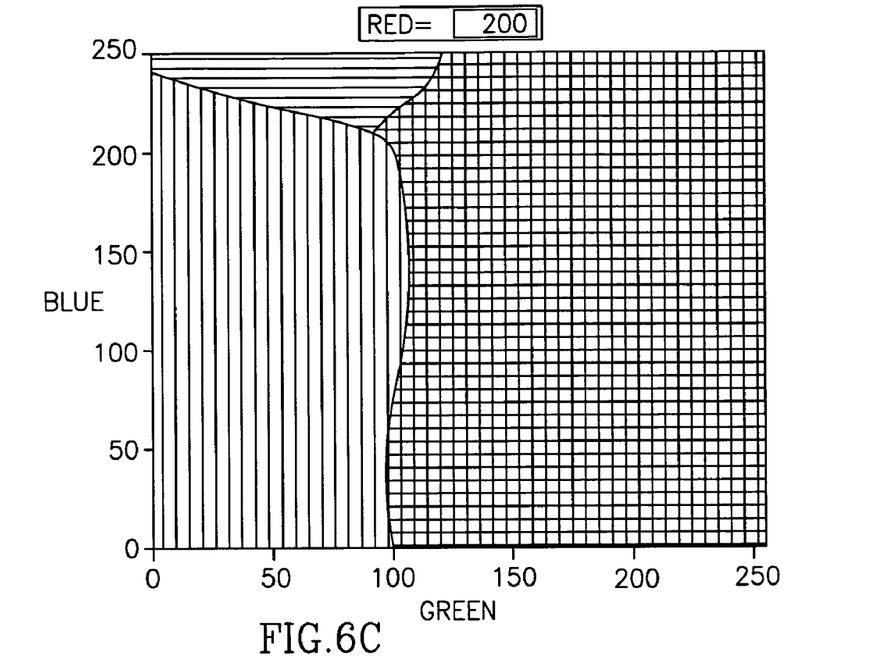
Figure 6D:
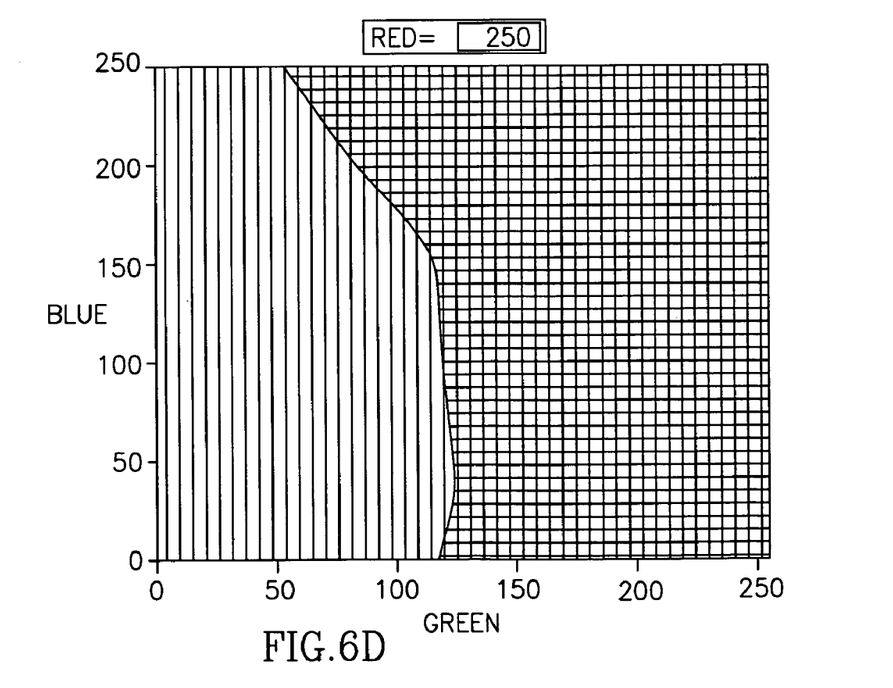

FIG. 5, to which reference is now made, is a plot of color range database 72 for an exemplary calibration in a system having seven (7) bar code colors (i.e. N=7). The axes of FIG. 5 are the three color axes, red, green and blue, and plotted are the values of the received data. As can be seen, the color space is a cube 73 of size 255×255×255 and the seven viewed colors hardly fill cube 73. Instead, each color 74 fills a very small volume of cube 73. As a result, there are portions 76 in the color space not associated with any of the seven colors.

Color range database 72 may optionally be provided to color classifier 46 (FIG. 1), described in more detail hereinbelow with respect to FIGS. 7 and 8, to generate color calibration lookup table (LUT) 94 which associates each point in color space 73 with only one of the N bar code colors of the color code. Reference is now briefly made to FIGS. 6A, 6B, 6C and 6D, which show the output of color classifier 46 for the exemplary database 72 plotted in FIG. 5. FIGS. 6A, 6B, 6C and 6D are slices of cube 73 taken along the red axis, where red=10 for FIG. 6A, 150 for FIG. 6B, 200 for FIG. 6C and 250 for FIG. 6D. As can be seen, the entire color cube 73 is now filled and each data point is associated with only one bar code color. Thus, color space 73 is now divided into seven sections, one per bar code color.

Figure 7:
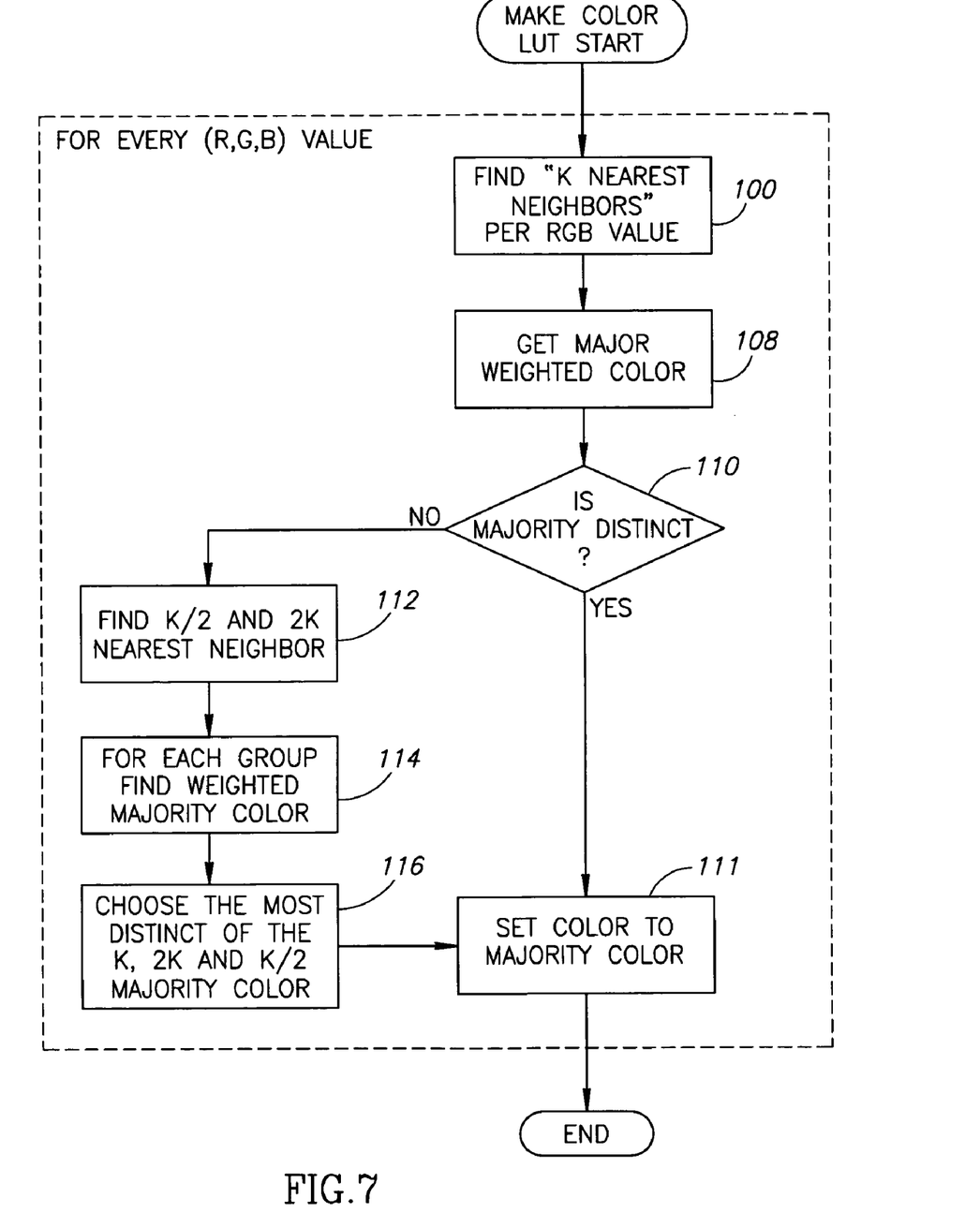
FIG. 7 is a flow chart illustration of a color classification method forming part of the system of FIG. 2.
Figure 8:
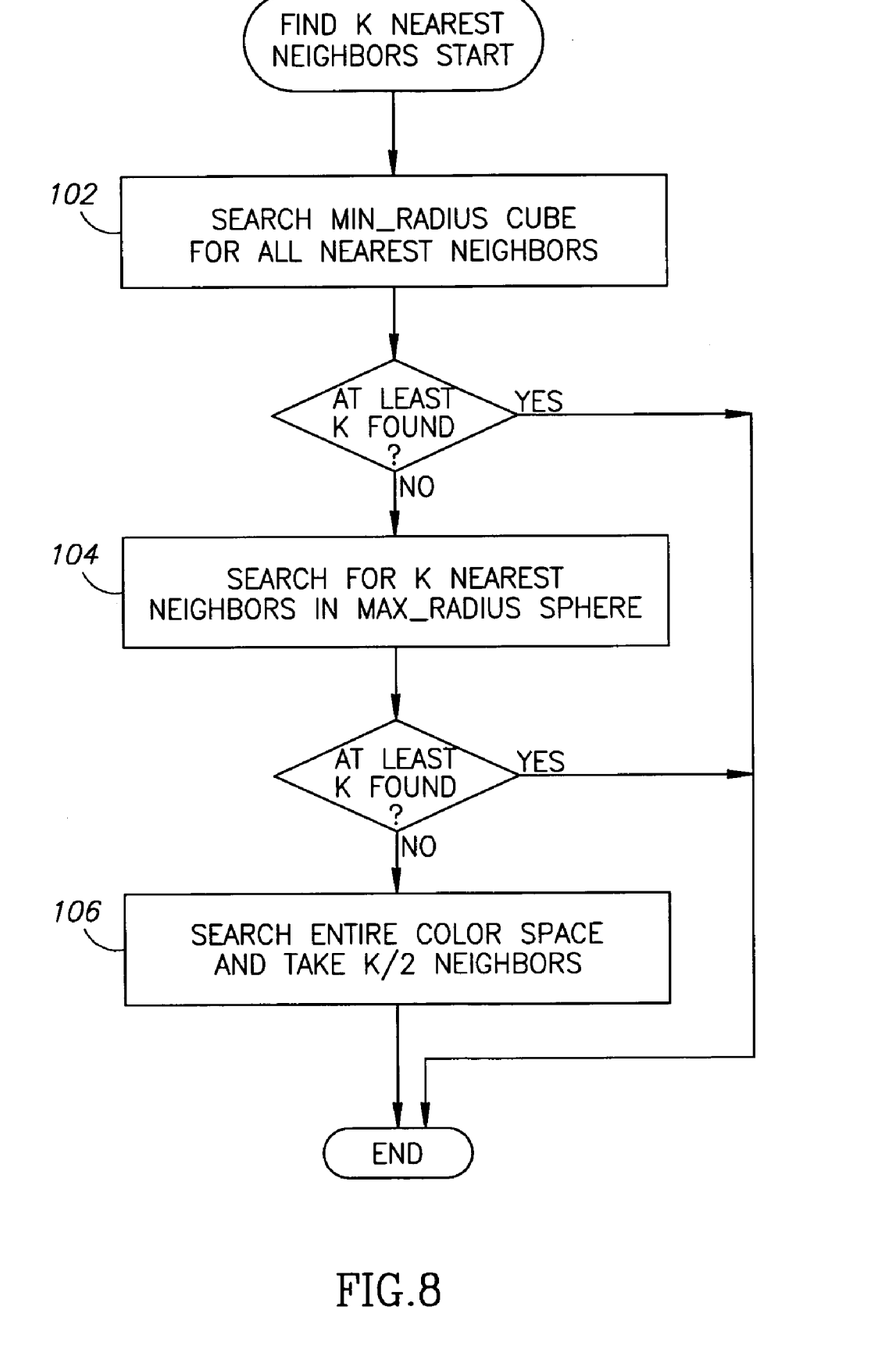
FIG. 8 is a flow chart illustration of a k-nearest neighbor calculation performed in the method of FIG. 7.

FIGS. 7 and 8, to which reference is now made, show the method performed by color classifier 46 to produce color calibration LUT 94. In general, color classifier 46 may assign each and every point in the RGB color space 73 with a bar code color label, based on a set of inputted RGB values with their corresponding bar code color labels. This is actually a classic classification problem. Given a set of training vectors, i.e. a set of samples and their corresponding labels, provide a label to an arbitrary test point x.

Color classifier 46 may operate similar to the well-known k-nearest-neighbor algorithm, such as can be found in the book Pattern Classification by Duda, Hart and Stork, pp. 4–13, 174–187.

The standard k-nearest-neighbor algorithm may classify a test point x by assigning it the label most frequently represented among the k nearest samples; in other words, a decision may be made by examining the labels on the k nearest neighbors and taking a vote. The k-nearest-neighbor query may start at the test point x and may grow a spherical region until it encloses k training samples, and it may label the test point x by a majority vote of these samples.

In the present invention, there may be more than one training vector per RGB value, and their labels may not be identical due to noise. Hence, all RGB values in the RGB color space may be assigned a bar code color label, including RGB values that are used as training vectors.

Moreover, there may be an uneven amount of training vectors for the bar code colors and the results may be biased. In order to overcome this flaw, color classifier 46 may pre-calculate a weight per bar code color, so that the histogram of the training vector's bar code colors may be equalized. For example, suppose there were 5 bar code colors, of which four colors have 100 training vectors and one has 95 training vectors. In this example, the training vectors for the four bar code colors may receive a weight of 1, while the training vectors of the fifth bar code color may receive a weight of 1.053 (100/95).

Color classifier 46 may initially find (step 100) a RGB value's k-nearest-neighbors, for example, k=10, but with some modifications. The following steps (shown in detail in FIG. 8) describe this process in detail. In any case, once at least k neighbors are found, the rest of the steps are skipped.

1. (Step 102) Within a MIN_RADIUS (for example, MIN_RADIUS=3) cube of the current test point color classifier 46 may take all (even more than k) of the training vectors.
2. (Step 104) Within a MAX_RADIUS (for example, MAX_RADIUS=10) sphere of the current test point, color classifier 46 may take a minimum of k nearest neighbors. If there are two or more training vectors at equal distance from the test point, color classifier 46 may include all of them.
3. (Step 106) Color classifier 46 may search the entire color space 73 for k/2 neighbors.

Given the k nearest neighbors, color classifier 46 may select (step 108 of FIG. 7) the bar code color with the highest score, based on a weighted vote among the k neighbors. Color classifier 46 may sum the number of training vectors of a particular bar code color and multiply the sum by that color's weight to produce the score for that bar code color.

Color classifier 46 may now determine (step 110) if the majority is distinct. In other words, if the selected bar code color is higher by a significant amount, that color has a distinct majority. In one embodiment, the highest score may be greater by at least 1 than the second highest score to be distinct. If the majority is distinct, color classifier 46 may conclude (step 111) by setting the label for the current RGB value to that of the majority bar code color. Otherwise, color classifier 46 may repeat the process for 2k and k/2 training vectors (step 112) and may choose the most distinct of the k, 2k and k/2 majority colors (steps 114 and 116).

Finally, color classifier 46 may set the bar code color for the current RGB value to the majority bar code color produced from steps 110 or 116. Color classifier 46 may repeat the process for all of the RGB values of color space 73 and may produce color calibration LUT 94 as a result.

It will be appreciated that color calibration LUT 94 may be produced by many methods; the method described above with respect to FIGS. 7 and 8 is only one embodiment. Other embodiments are incorporated within the present invention.

It will further be appreciated that calibration system 40 (FIG. 2) may produce one color calibration LUT 94 or multiple LUTs. In one embodiment, calibration system 40 may produce a single LUT 94 for all environmental conditions. In another embodiment, calibration system 40 may produce one LUT 94 for each expected lighting condition. In the latter embodiment, identifier 39 (FIG. 1) may change LUTs whenever the lighting condition may change. This change may occur automatically or in response to a user indication.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A color bar code system comprising:
   a camera reader to read at least one bar code, said bar code being formed of a subset of N bar code colors;
   a color association unit to associate each point in a color space with one of said bar code colors, said color association unit being calibratable to the range of colors that said camera reader is expected to produce given at least one environmental condition in which it operates, wherein said at least one environmental condition is at least one of the following conditions: a lighting condition, a camera condition and a printed color condition;
   an identifier to use said color association unit to identify an item associated with said bar code from the output of said camera reader.

2. A system according to claim 1 and wherein said color association unit is a lookup table.

3. A system according to claim 1 wherein said environmental condition includes at least two lighting conditions and wherein said color association unit is at least two lookup tables, one per lighting condition.

4. A method comprising:
   identifying an item associated with a bar code having a subset of N bar code colors from the output of a camera reader and from a color association unit which associates each point in a color space with one of said bar code colors, said color association unit being calibratable to the range of colors that said camera reader is expected to produce given at least one environmental condition in which it operates, wherein said at least one environmental condition is at least one of the following conditions: a lighting condition, a camera condition and a printed color condition.

5. A method according to claim 4 and wherein said color association unit is a lookup table.

6. A method according to claim 5 wherein said environmental condition includes at least two lighting conditions and wherein said color association unit is at least two lookup tables, one per lighting condition.

* * * * *